United States Patent
Kumar et al.

(10) Patent No.: US 9,354,711 B2
(45) Date of Patent: May 31, 2016

(54) DYNAMIC HAND-GESTURE-BASED REGION OF INTEREST LOCALIZATION

(71) Applicant: Xerox Corporation, Norwalk, CT (US)

(72) Inventors: Jayant Kumar, Webster, NY (US); Xiaodong Yang, New York, NY (US); Qun Li, Webster, NY (US); Raja Bala, Pittsford, NY (US); Edgar A. Bernal, Webster, NY (US); Jeyasri Subramanian, San Antonio, TX (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/553,752

(22) Filed: Nov. 25, 2014

(65) Prior Publication Data
US 2016/0091976 A1 Mar. 31, 2016

Related U.S. Application Data (60) Provisional application No. 62/057,346, filed on Sep. 30, 2014.

(51) Int. Cl.
| | |
|---|---|
| *G06F 3/01* | (2006.01) |
| *G06K 9/00* | (2006.01) |
| *G06K 9/20* | (2006.01) |
| *G06T 7/00* | (2006.01) |

(52) U.S. Cl.
CPC ............ *G06F 3/017* (2013.01); *G06K 9/00355* (2013.01); *G06K 9/2081* (2013.01); *G06T 7/0097* (2013.01); *G06T 2207/10016* (2013.01); *G06T 2207/30196* (2013.01)

(58) Field of Classification Search
CPC ... G06F 3/017; G06F 3/04815; G06F 1/1694; G06F 1/3206; G06F 2200/1614; G06F 2200/1636; G06F 2200/1637; G06F 3/0346; G06F 3/0304; G06F 2203/04106; G06F 1/163; G06K 9/00355; G06K 9/2081; G06K 9/52; H04B 7/26; H04B 1/3833; H04B 1/385; H04M 1/67; H04M 1/7253; H04M 2250/12; H04M 2250/22; G02B 27/01; G02B 27/0138; G02B 27/014; G02B 27/017
See application file for complete search history.

(56) References Cited

U.S. PATENT DOCUMENTS

| | | | | |
|---|---|---|---|---|
| 7,142,191 | B2 * | 11/2006 | Idesawa ................ | G06F 1/1601 345/156 |
| 8,203,605 | B1 * | 6/2012 | Starner ................ | G06T 7/2006 348/115 |
| 8,558,759 | B1 | 10/2013 | Prada Gomez et al. | |
| 2008/0181459 | A1 * | 7/2008 | Martin ................ | G06K 9/00355 382/103 |
| 2010/0141555 | A1 * | 6/2010 | Rorberg ................ | G02B 27/017 345/8 |
| 2010/0226535 | A1 * | 9/2010 | Kimchi ................ | G06F 3/013 382/103 |
| 2012/0075168 | A1 * | 3/2012 | Osterhout ............ | G02B 27/017 345/8 |
| 2013/0293580 | A1 * | 11/2013 | Spivack ............ | G06Q 30/0643 345/633 |
| 2014/0225918 | A1 * | 8/2014 | Mittal ................ | G06F 3/017 345/633 |

* cited by examiner

*Primary Examiner* — Kenneth Bukowski (57) ABSTRACT

A method, non-transitory computer-readable medium, and apparatus for localizing a region of interest using a dynamic hand gesture are disclosed. For example, the method captures the ego-centric video containing the dynamic hand gesture, analyzes a frame of the ego-centric video to detect pixels that correspond to a fingertip using a hand segmentation algorithm, analyzes temporally one or more frames of the ego-centric video to compute a path of the fingertip in the dynamic hand gesture, localizes the region of interest based on the path of the fingertip in the dynamic hand gesture and performs an action based on an object in the region of interest.

19 Claims, 8 Drawing Sheets

DYNAMIC HAND-GESTURE-BASED REGION OF INTEREST LOCALIZATION

CROSS-REFERENCE TO RELATED APPLICATIONS

This application claims priority under 35 U.S.C. §119(e) to U.S. provisional patent application Ser. No. 62/057,346, filed on Sep. 30, 2014, which is hereby incorporated by reference in its entirety.

FIELD OF INVENTION

The present disclosure relates generally to detecting regions of interest in video frames acquired by head-mounted video devices and, more particularly, to a method and apparatus for localizing a region of interest within a video frame using a dynamic hand gesture.

BACKGROUND

Wearable devices are being introduced by various companies and are becoming more popular in what the wearable devices can do. One example of a wearable device is a head-mounted video device such as Google Glass®.

A critical capability with wearable devices, such as the head-mounted video device, is detecting a region of interest in video or imagery of a scene in real-time as a given activity is proceeding. As the population moves from traditional environmental cameras to mobile and wearable cameras, it becomes important to consider not only the accuracy of the method, but also the power and computing resource usage since the wearable devices may have very limited processing and computing resources. For example, the wearable devices are much smaller than traditional laptop computers and desktop computers and do not have room to accommodate high-powered processors and a large amount of memory.

Some current methods that are used to detect a region of interest use anticipated shapes to detect a hand gesture. For example, the method may look to see if the image contains any shapes that match a predefined library of shapes. However, if the shape is not in the predefined library then the region of interest may not be detected. In cases in which the shape of the region of interest does not coincide with a shape in the predefined library, the region of interest may not be detected. Moreover, such methods are computationally expensive due to the cost of sliding-window-based template matching, and therefore, are not suitable for wearable computing where power consumption is of critical concern. Furthermore, some scenarios require the selection of regions of interest that extend beyond the field of view of the device. In these cases, no predefined library of static shapes will support selection of the region of interest. Methods for dynamic hand-gesture-based region of interest localization are desirable because they are not limited to specific shapes or enclosures, and they support the localization of regions of interest that extend beyond the field of view of the camera.

SUMMARY

According to aspects illustrated herein, there are provided a method, a non-transitory computer-readable medium, and an apparatus for localizing a region of interest using a dynamic hand gesture. One disclosed feature of the embodiments is a method that captures the ego-centric video containing the dynamic hand gesture, analyzes a frame of the ego-centric video to detect pixels that correspond to a fingertip using a hand segmentation algorithm, analyzes temporally one or more frames of the ego-centric video to compute a path of the fingertip in the dynamic hand gesture, localizes the region of interest based on the path of the fingertip in the dynamic hand gesture and performs an action based on an object in the region of interest.

Another disclosed feature of the embodiments is a non-transitory computer-readable medium having stored thereon a plurality of instructions, the plurality of instructions including instructions which, when executed by a processor, cause the processor to perform operations that capture the ego-centric video containing the dynamic hand gesture, analyzes a frame of the ego-centric video to detect pixels that correspond to a fingertip using a hand segmentation algorithm, analyzes temporally one or more frames of the ego-centric video to compute a path of the fingertip in the dynamic hand gesture, localizes the region of interest based on the path of the fingertip in the dynamic hand gesture and performs an action based on an object in the region of interest.

Another disclosed feature of the embodiments is an apparatus comprising a processor and a computer-readable medium storing a plurality of instructions which, when executed by the processor, cause the processor to perform operations that capture an ego-centric video containing the dynamic hand gesture, analyzes a frame of the ego-centric video to detect pixels that correspond to a fingertip using a hand segmentation algorithm, analyzes temporally one or more frames of the ego-centric video to compute a path of the fingertip in the dynamic hand gesture, localizes a region of interest based on the path of the fingertip in the dynamic hand gesture and performs an action based on an object in the region of interest.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer-readable medium and an apparatus for localizing a region of interest using a dynamic hand gesture.

Current methods for detecting a region of interest use a database of predefined shapes. For example, the shapes created by a user's hand must be anticipated and predefined to be able to detect a region of interest. In addition, current methods use static hand gestures. For example, a user may place his or her hand around a region of interest and the user's hand remains still.

In contrast, embodiments of the present disclosure detect a region of interest selected by a dynamic hand gesture. In one embodiment, a hand segmentation algorithm may be used to detect a fingertip. The fingertip may then be moved around a sequence of frames to indicate the location of a region of interest within the image. One or more frames of the ego-centric video may be analyzed temporally to track the motion of the fingertip in the one or more frames. A visible marker or line may be used to display the path of the fingertip to the user on the display of the head-mounted video device.

Once the region of interest is properly identified, the object within the region of interest may be cropped and used to perform an action based on the object. For example, the embodiments of the present disclosure may be used for automatic license plate recognition to automatically fill out a ticket for law enforcement officials, initiating a tracking task of a person or vehicle within the region of interest, translating a sign selected within the region of interest, and the like.

Figure 1:
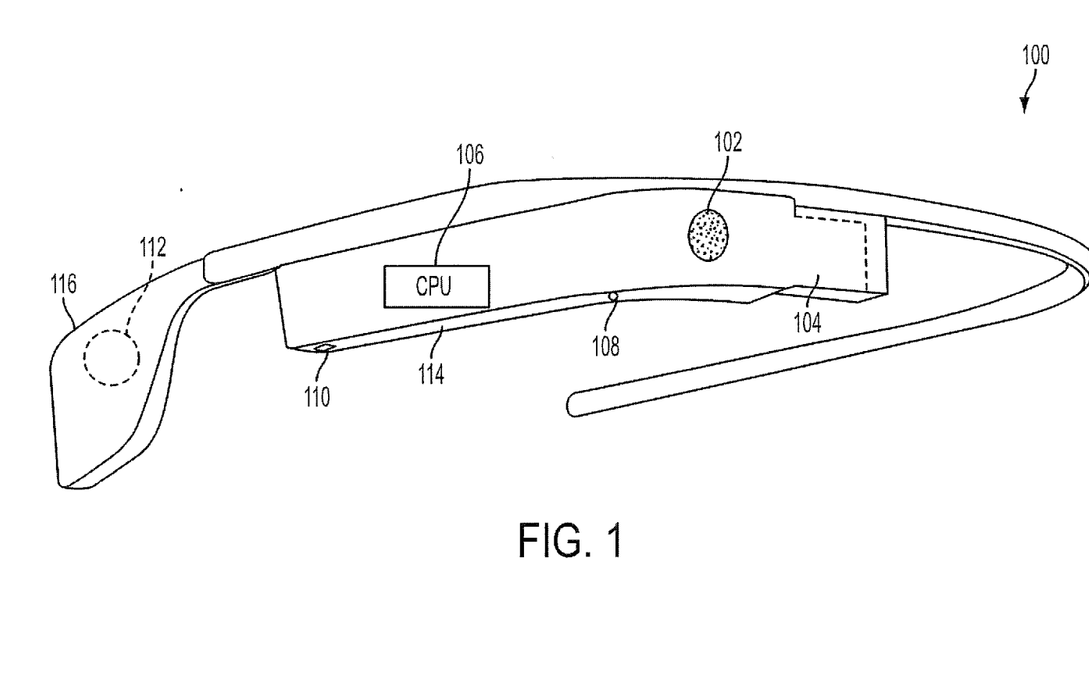
FIG. 1 illustrates a block diagram of a head-mounted video device of the present disclosure.

FIG. 1 illustrates an example of a head-mounted video device 100 of the present disclosure. In one embodiment, the head-mounted video device 100 may be a device, such as for example, Google Glass®. In one embodiment, the head-mounted video device 100 may include a camera 102, a display 104, a processor 106 (e.g., CPU), a microphone 108, one or more speakers 110 and a battery 112. In one embodiment, the processor 106, the camera microphone 108 and the one or more speakers 110 may be inside of or built into a housing 114. In one embodiment, the battery 112 may be inside of an arm 116.

It should be noted that FIG. 1 illustrates a simplified block diagram of the head-mounted video device 100. The head-mounted video device 100 may include other modules not shown, such as for example, a global positioning system (GPS) module, a memory, wireless connectivity, and the like.

In one embodiment, the camera 102 may be used to capture ego-centric video. In one embodiment, ego-centric video may be defined as video that is captured from a perspective of a user wearing the head-mounted video device 100. The exact location of head-worn camera can give slightly different view. In other words, the ego-centric video is approximately a view of what the user is also looking at.

In one embodiment, commands for the head-mounted video device 100 may be based on hand gestures. Ego-centric video that is captured by the camera 102 may contain a plurality of different objects in an image. For example, the head-mounted video device 100 may have a difficult time figuring out which particular object the user is focusing on. In one embodiment, the present disclosure allows a user to enclose a particular object of interest to the user in a video frame using his or her hands. In other words, a region of interest may be selected by using a dynamic hand gesture (e.g., tracing around an object with a finger, underlining an object with a finger, pointing at an object, and the like). Once the region of interest is selected, an action may be automatically performed based on the object within the region of interest.

In one embodiment, the head-mounted video device 100 may also include a hand detection module, a temporal hand gesture recognition module and a region of interest extraction module. In one embodiment, the hand detection module may identify the pixels belonging to the user's hand in each video frame. In one embodiment, the temporal hand gesture recognition module may detect specific temporal hand and finger movements tracing a path in the vicinity of a region of interest. In one embodiment, the region of interest extraction module may compute a tightest bounding box enclosing the traced path.

Figure 2:
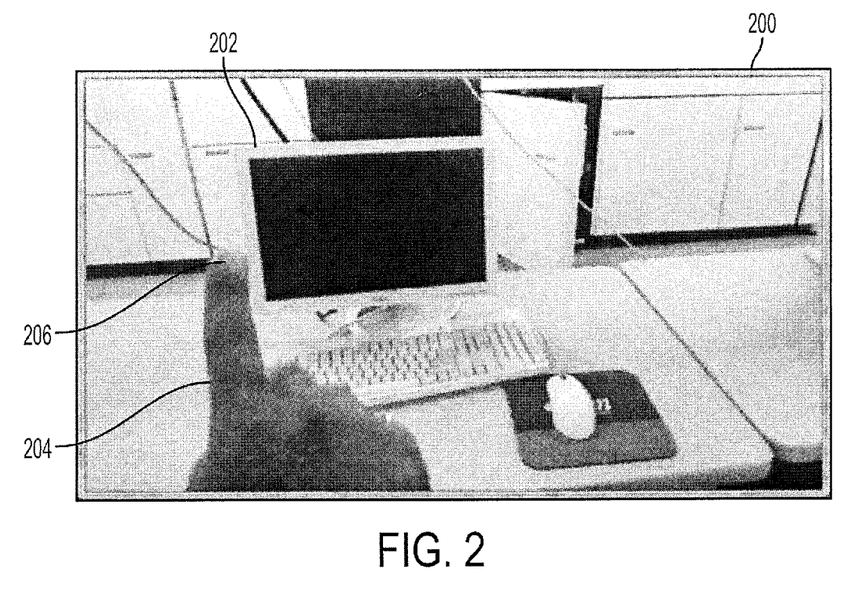
FIG. 2 illustrates one embodiment of an ego-centric video frame captured from a head-mounted video device with a dynamic hand gesture indicating a region of interest.

FIG. 2 illustrates an example of a frame 200 of an ego-centric video image that was captured. The frame 200 contains an object 202 (e.g., the computer monitor) to which the user would like the head-mounted video device 100 to pay special attention to. In one embodiment, the user may select a region of interest around the object 202 using a dynamic hand gesture. For example, the user may move his or her fingertip 206 of his or her hand 204 around the object 202 to select a region of interest.

In one embodiment, the dynamic hand gesture may be defined as a gesture generated by moving a hand or fingers of the hand. In other words, the hand may be located in different portions of consecutive frames of a video image, unlike a static hand gesture where a user's hand remains relatively stationary throughout each frame of the video image.

Figure 3:
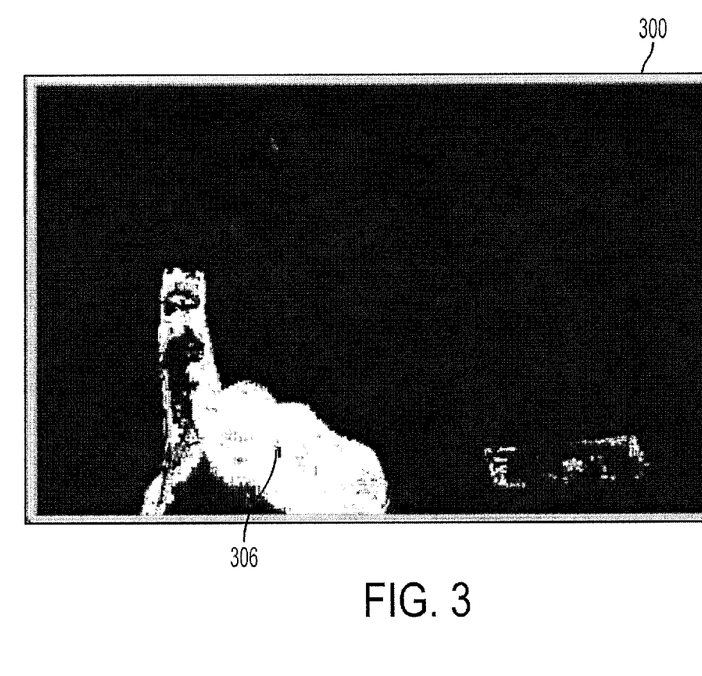
FIG. 3 illustrates one embodiment of a binary mask obtained by a hand segmentation module used to detect a finger tip.

After the frame 200 is captured from the ego-centric video, the frame 200 may be analyzed via a hand segmentation algorithm to create a binary mask indicating the hand pixels within the frame and detect a fingertip of the hand pixels. FIG. 3 illustrates an example binary mask 300 that is generated from the hand segmentation algorithm.

In one embodiment, the hand segmentation algorithm that may be used may be the methods described in co-pending application Ser. No. 14/501,250 filed on Sep. 30, 2014 that contents of which are incorporated herein by reference in its entirety. For example, the head-mounted video device 100 may be trained to detect hands and the characteristic or characteristics used to train the hand detection (e.g., an RGB color value of the hand pixels) may be used to identify the hand pixels in the video frame.

However, the initial hand segmentation algorithm may contain some errors. For example, the errors may include false positive enclosures. As a result, image processing may be applied to the binary mask to help reduce instances of potential false positives and false negatives. In one embodiment, the image processing may be a set of morphological operations that may include dilation and erosion to fill up some of the smaller holes and eliminate some of the smaller mask structures.

In one embodiment, a fingertip used to indicate the location of the region of interest may be detected from the binary mask 300 obtained from the hand segmentation algorithm. For example, the binary mask 300 and the hand segmentation algorithm may be used to identify one or more pixels that correspond to a hand region 306. The pixels in the hand region 306 may then be analyzed to identify the pixels with the largest or smallest coordinates along a given dimension (e.g., horizontal, vertical or diagonal, or equivalently, across columns or rows), or to identify pixels that have the most extreme coordinate values.

Figure 4:
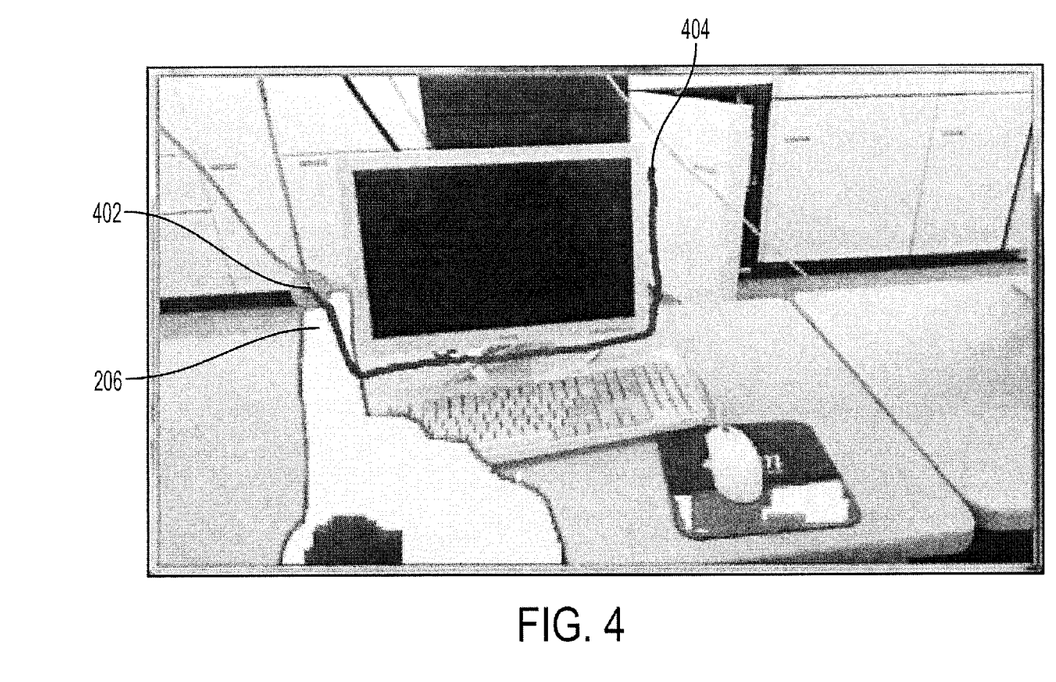
FIG. 4 illustrates one embodiment of a frame that includes a partial region of interest drawn by the dynamic hand gesture.

FIG. 4 illustrates a fingertip mark 402 that may identify a location of the fingertip 206. In one embodiment, a line or a path 404 may be used to track or trace a path of the fingertip 206 during the course of the ego-centric video that is captured. In one embodiment, the location of the fingertip 206 may be localized on a frame-by-frame basis. In another embodiment, the fingertip 206 may be located in a single frame and then a motion tracking algorithm may be used to detect the fingertip 206 in subsequent frames, rather than performing the hand segmentation on each frame to detect the fingertip 206 in each frame that is analyzed.

As indicated above, the fingertip mark 402 may be used to display the estimated fingertip location to the user via the display 104. In one embodiment, the traced path of the fingertip 206 may be based on a temporal analysis (e.g., an analysis over a period of time) of each frame of the ego-centric video that is captured. In another embodiment, the traced path of the fingertip 206 may be based on a temporal analysis of every few frames (e.g., every 10 frames, every 50 frames, and so forth) and the path may be an estimation based on the location of the fingertip 206 in the frames that are analyzed. For example, for frames for which a fingertip 206 is not localized, a fingertip location can be estimated via spatial interpolation of the temporally nearest fingertip locations from frames for which a fingertip 206 is localized.

In other words, the user may use his or her fingertip 206 to perform a command (e.g., selecting a region of interest, selecting text, and the like) via a dynamic hand gesture. In one embodiment, the dynamic hand gesture may also be referred to as a time-varying hand gesture. In other words, the location of the user's hand 204 varies in different frames at different frames as the user's hand 204 moves to perform the dynamic hand gesture.

Figure 5:
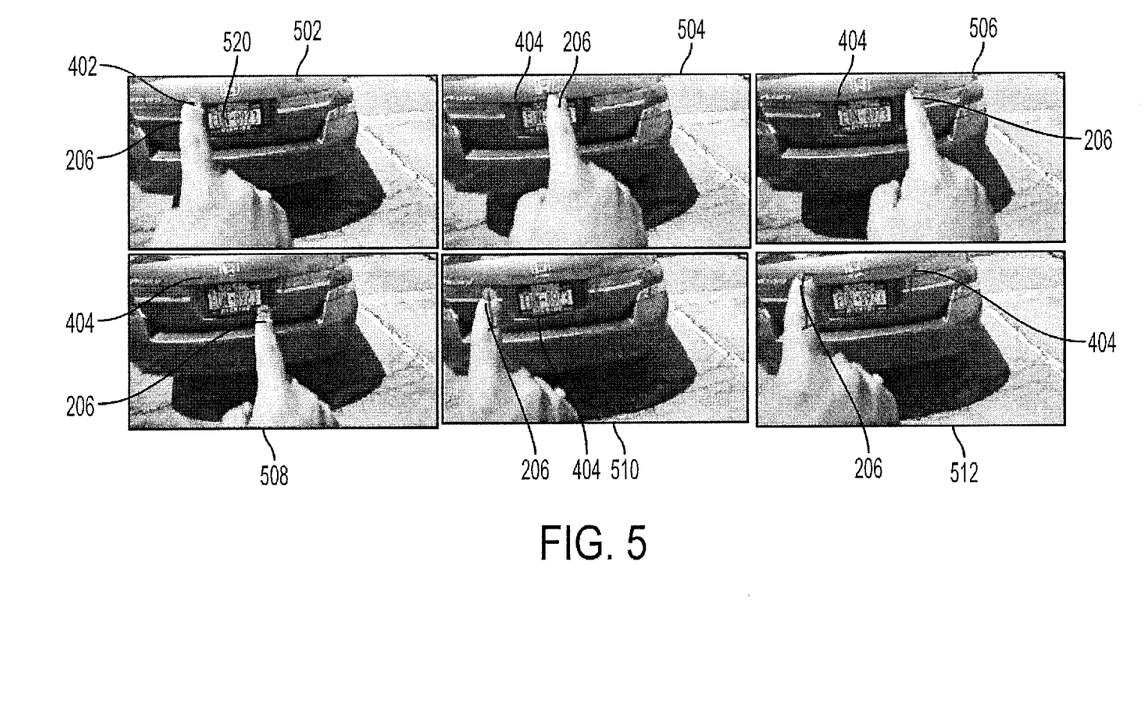
FIG. 5 illustrates one embodiment of a series of images showing a forefinger tracing process.

FIG. 5 illustrates a series of images (502-512) showing a forefinger tracing process. In one embodiment, a user may provide a signal or a prompt to the head-mounted video device 100 that the user is about to initiate a dynamic hand gesture to localize a region of interest. In one embodiment, the signal or the prompt may be a voice command, a gesture, a tap, a swipe, and the like.

As illustrated in FIG. 5 beginning with the image 502, the image 502 illustrates a fingertip 206 with a location of the fingertip 206 indicated by the fingertip marker 402. The user is interested in performing a dynamic hand gesture to select a region of interest around the object 520 in the image 502. As the user moves his or her fingertip 206 around the object 520 from the image 502 to the image 512, a marker or line 404 traces a path of the fingertip 206.

As noted above, in contrast to static hand gestures, the dynamic hand gesture is temporally tracked over one or more frames of the ego-centric video that is captured. In other words, multiple frames of the ego-centric video are analyzed to trace a path of the user's fingertip 206 as opposed to a single frame for static hand gestures. In one embodiment, each frame of the ego-centric video may be analyzed. In another embodiment, a number of frames may be skipped between frames that are analyzed (e.g., every other frame may be analyzed, every 10 frames may be analyzed, and the like).

In one embodiment, the fingertip 206 may be traced until a user provides a signal indicating that the dynamic hand gesture is complete. For example, the user may use a voice command, a gesture, a tap, a swipe, and the like.

In another embodiment, completion of the dynamic hand gesture may be detected when the fingertip 206 returns to approximately the same location that the fingertip began. In another embodiment, completion of the dynamic hand gesture may be detected when the path that is traced forms a closed loop.

Although, the region of interest is illustrated as an enclosure or a closed loop or rectangle in FIG. 5, it should be noted the region of interest may be an open path or shape. For example, the region of interest may be selected by an underlined path of the fingertip 206, a cross shape created by the fingertip 206 or a pointing gesture (e.g., detecting the location of the fingertip 206, detecting movement of the fingertip 206, then detecting the fingertip 206 coming to a stop in a temporal sequence of frames of the ego-centric video).

In one embodiment, once the dynamic hand gesture is completed, the portion of the image that was traced by a fingertip of the user may be localized as a region of interest. In one embodiment, the uppermost pixels within the region of interest may be searched to detect an object within the region of interest.

In one embodiment, the head of the user may drift while the tracing is taking place. The drift may make it difficult to accurately trace a path of the fingertip from frame to frame of the ego-centric video. For example, since the head of the user may drift while the tracing is taking place, the coordinate systems of the sequence of selected locations may be different. To address this issue, compensation may be performed to account for the drift of the head-mounted video device while capturing the ego-centric video. Various different types of compensation may be performed on the ego-centric video that is captured before analyzing the ego-centric video to track the path of the fingertip.

In one embodiment previously selected locations can be mapped to a unique coordinate system. In one embodiment, this unique coordinate system can be the current coordinate system. The mapping can be done, for example, by tracking salient features around the selected locations and estimating the distortion that took place between frames; alternatively, a motion vector field indicating pixel-wise displacements that occurred between frames can be computed. The distortion may be assumed to be purely translational motion. In one embodiment, this distortion may be approximated by a simple origin translation described by the motion vectors or the vectors describing the displacement of the salient features being tracked between frames, which may be a reasonable assumption if the frame rate is high enough. In other embodiments, rotations and projective transformations between frames can be estimated to map the set of coordinate systems to a unique coordinate system. This estimation can be performed, for example, by finding the projective transformation that best fits the computed motion vectors or displacement vectors resulting from feature tracking.

Figure 6:
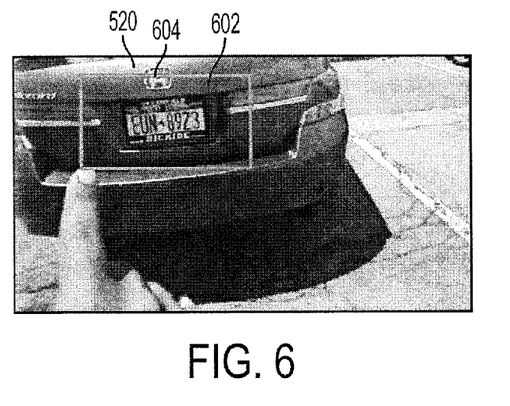
FIG. 6 illustrates one embodiment of an extraction of a region of interest based on the tracing process.

FIG. 6 illustrates an example extraction of a region of interest 602 based on the tracing process. For example, a shape 604 similar to the shape traced by the user may be overlaid and used to surround the localized region of interest 602. In one embodiment, the shape 604 may be any shape (e.g., a square, rectangle, circle, oval, polygon, triangle, a straight line, a cross, and the like).

In one embodiment, the analysis performed in FIGS. 2-5 may be performed on low-resolution video. However, the region of interest 602 may be extracted and displayed on a video in a high resolution. For example, the region of interest coordinates may be calculated from the low-resolution preview video and then scaled to corresponding coordinates in the high-resolution video.

In one embodiment, the head-mounted video device 100 may receive confirmation from a user to determine if the fingertip 206 was accurately detected and/or to determine if the region of interest 602 was correctly localized. In one embodiment, the head-mounted video device 100 may wait for an input confirmation from the user. For example, the user may blink or provide a voice command (e.g., saying "yes" or "no").

In another embodiment, the head-mounted video device 100 may simply receive an input confirmation from the user when no action is taken. For example, the display 104 may indicate to the user that the location of the fingertip 206 or the localized region of interest 602 will be assumed to be correct if no input is received within a predefined period of time (e.g., within five seconds).

In one embodiment, region of interest 602 is correctly localized, then the object 520 within the region of interest 602 may be cropped and an action may be automatically performed based on the object. For example, in FIG. 6 the object 520 (e.g., the license plate) may be cropped and an optical character recognition program may be applied to the license plate to read the alphanumeric text.

In one embodiment, the license plate number may be used to obtain driver information and one or more fields of a form (e.g., a parking ticket) may be automatically populated with information obtained from the license plate including the license plate number. In another embodiment, the license plate may be cropped and read as part of an automatic license recognition program.

In another embodiment, the user may select a region of interest that includes a person in a crowd or a moving vehicle in traffic. The person or vehicle may be identified and then automatically tracked. For example, the shape may be fixed around the person or vehicle as the person or vehicle is moving and the user follows the person or vehicle.

In another embodiment, the user may select a region of interest with the enclosure that includes a sign in a foreign language. An optical character recognition program may be applied to read the text on the sign. A translation may be automatically performed and provided to the user.

In yet another embodiment, individual images of the region of interest corresponding to the sequence of frames throughout which the selection of the region of interest was performed can be combined to form a super-resolved image of the region of interest, that is, an image of the region of interest that has a larger resolution than that of the video captured natively by the video acquisition device.

Although the example dynamic hand gesture illustrated in FIGS. 2-6 illustrates a user creating a closed loop, it should be noted that any dynamic hand gesture may be used. For example, the user may be reading text and want to underline a word or sentence. The user may use his or her fingertip 206 to draw a line under a word and an action may be automatically performed on the word (e.g., looked up in a dictionary or thesaurus, stored, deleted, and the like). For example, a drop down menu may be displayed to the user that includes one or more actions that can be performed on the word. In one embodiment, other dynamic hand gestures may include tick marks, crosses, and the like.

In addition, although the objects of interest in the images in FIGS. 2-6 are within a frame of the ego-centric video, some objects may be larger than the frame. In other words, the region of interest may be too large to fit within a size of a single frame. In one embodiment, the region of interest may be traced with a fingertip 206 using a combination of the dynamic hand gesture and movement of the user's head (e.g., a panoramic view). For example, the user may move the camera 102 on the head-mounted video device 100 with the user's head to follow the dynamic hand gesture of the user's hand 204. Thus, the localized region of interest 602 that is traced via the hand gesture may be larger than what would fit in a single frame. In one embodiment, once the region of interest 602 is localized, the captured images may be combined or stitched together to show a general view that can fit the localized region of interest in a single frame.

As a result, the embodiments of the present disclosure provide a dynamic hand gesture detection algorithm for detecting a region of interest and automatically performing an action based on an object in the region of interest. Notably, the embodiments of the present disclosure do not require a database of pre-defined shapes.

Figure 7:
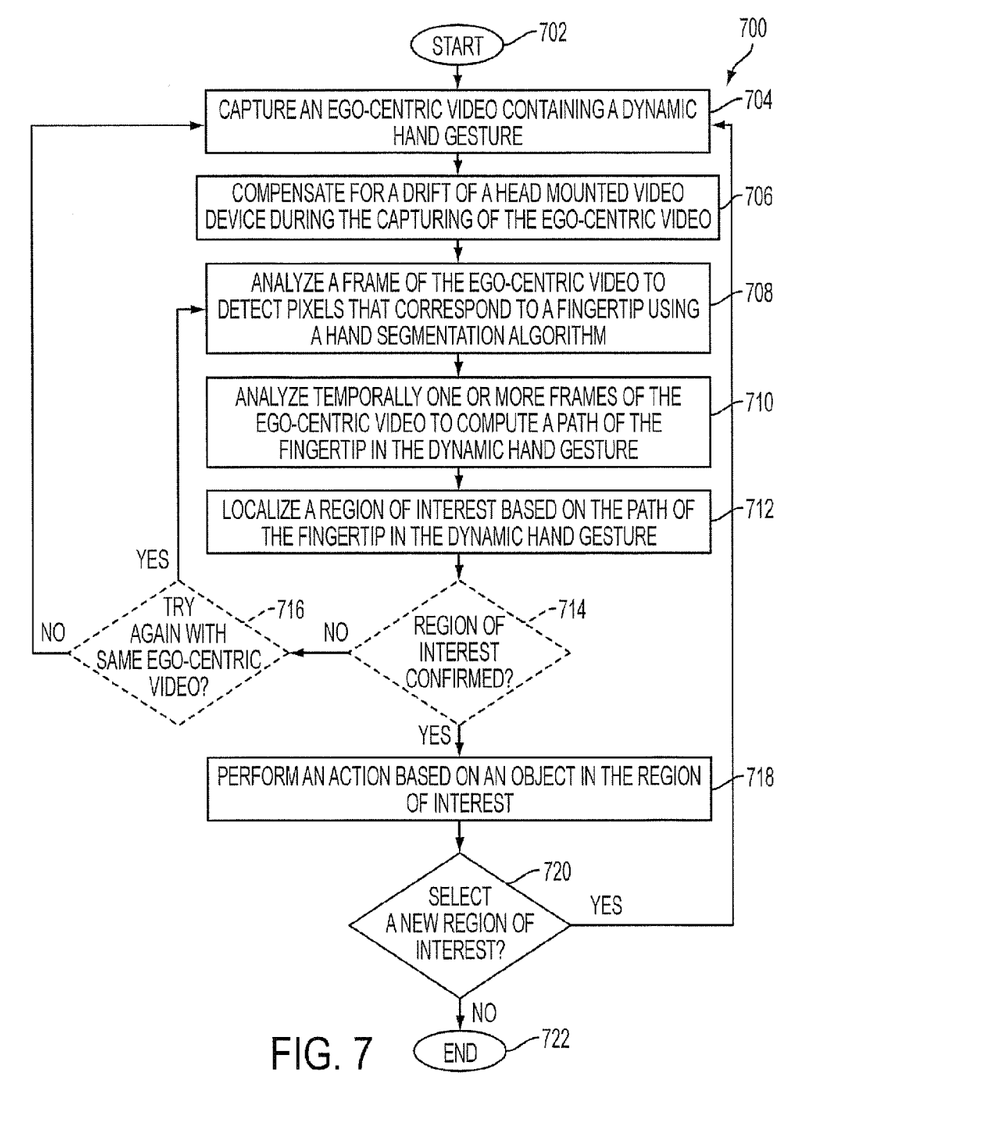
FIG. 7 illustrates a flow chart for a method for localizing a region of interest in an ego-centric video using a dynamic hand gesture.
Figure 8:
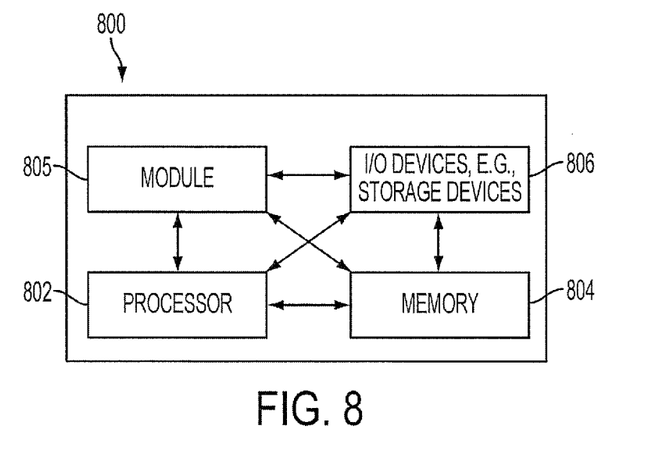
FIG. 8 illustrates a high-level block diagram of a computer suitable for use in performing the functions described herein.

FIG. 7 illustrates a flowchart of a method 700 for localizing a region of interest using a hand gesture. In one embodiment, one or more steps or operations of the method 700 may be performed by the head-mounted video device 100 or a computer as illustrated in FIG. 8 and discussed below.

At step 702 the method 700 begins. At step 704, the method 700 captures an ego-centric video containing a dynamic hand gesture. For example, a user may be attempting to perform a command via a dynamic hand gesture. The camera on the head-mounted video device may capture an ego-centric video of the user performing the dynamic hand gesture command (e.g., selecting a region of interest by moving the user's fingertip around an object).

In one embodiment, the user may signal or prompt the initiation of the acquisition of the image from the ego-centric video. For example, the signal or prompt may be an audio command, a tap or a swipe gesture. After the prompt is received the image may be a still image or a frame captured from the ego-centric video.

At step 706, the method 700 compensates for a drift of the head-mounted video device during the capturing of the ego-centric video. For example, the head of the user may drift while the tracing is taking place. The drift may make it difficult to accurately trace a path of the fingertip from frame to frame of the ego-centric video. Various different types of compensation may be performed on the ego-centric video that is captured before analyzing the ego-centric video to track the path of the fingertip.

In one embodiment previously selected locations can be mapped to a unique coordinate system. In one embodiment, this unique coordinate system can be the current coordinate system. The mapping can be done, for example, by tracking salient features around the selected locations and estimating the distortion that took place between frames; alternatively, a motion vector field indicating pixel-wise displacements that occurred between frames can be computed. In one embodiment, this distortion may be approximated by a simple origin translation described by the motion vectors or the vectors describing the displacement of the salient features being tracked between frames, which may be a reasonable assumption if the frame rate is high enough. In other embodiments, rotations and projective transformations between frames can be estimated to map the set of coordinate systems to a unique coordinate system. This estimation can be performed, for example, by finding the projective transformation that best fits the computed motion vectors or displacement vectors resulting from feature tracking.

At step 708, the method 700 analyzes a frame of the ego-centric video to detect pixels that correspond to a fingertip using a hand segmentation algorithm. Any hand segmentation or detection algorithm may be used. One example hand segmentation algorithm that may be used is disclosed in co-pending application Ser. No. 14/501,250 filed on Sep. 30, 2014 that contents of which are incorporated herein by reference in its entirety. For example, the head-mounted video device may be trained to detect hands and the characteristic or characteristics used to train the hand detection (e.g., an RGB color value of the hand pixels) may be used to identify the hand pixels in a binary mask and the hand enclosure formed by the user's hand.

At step 710, the method 700 analyzes temporally one or more frames of the ego-centric video to compute a path of the fingertip in the dynamic hand gesture. For example, the initial location of the fingertip may be determined based on the pixels with a largest or smallest coordinate value along a given dimension, or the most extreme coordinate values, in a hand region of the binary mask obtained by the hand segmentation algorithm.

Then the location of the fingertip may be tracked using any one of a variety of different methods. In one embodiment, the location of the fingertip may be localized on a frame-by-frame basis. For example, each frame of the ego-centric video that is captured may be analyzed to determine the location of the fingertip and compute the path of the fingertip over all of the frames of the ego-centric video.

In another embodiment, every few frames may be analyzed (e.g., every other frame, every 5 frames, every 20 frames, and the like). In other words, the path of the fingertip may be an estimation based on spatial interpolation of the temporally nearest fingertip locations from frames for which the fingertip is localized.

In another embodiment, the fingertip may be located in a single frame and then a motion tracking algorithm may be used to detect the fingertip in subsequent frames. In other words, the location of the fingertip may only need to be located once in a first frame and then the path may be estimated using the motion tracking algorithm.

In one embodiment, the analysis may be performed until the path of the dynamic hand gesture is completed. In one embodiment, the method 700 may determine that the path is completed when a signal is received. For example, the user may use a voice command, a gesture, a tap, a swipe, and the like.

In another embodiment, completion of the dynamic hand gesture may be detected when the fingertip returns to approximately the same location that the fingertip began. In another embodiment, completion of the dynamic hand gesture may be detected when the path that is traced forms a closed loop.

At step 712, the method 700 localizes a region of interest based on the path of the fingertip in the dynamic hand gesture. For example, after the correct enclosure formed by the dynamic hand gesture is detected, the area within the enclosure is localized as a region of interest that is of particular interest to the user. In other words, a portion of the image that is acquired from the ego-centric video is selected as the region of interest.

In one embodiment a shape may be fitted around the region of interest. In one embodiment, the shape may be a circle, a rectangle, a square, a polygon, and the like. In one embodiment, the shape may then be presented as an overlay onto the displayed image. In one embodiment, the object in the region of interest may be cropped.

At optional step 714, the method 700 determines if the region of interest is confirmed. For example, the shape around the region of interest may be displayed to a user in a wearable heads-up display. The user may then provide an input of confirmation that the shape is accurately around the region of interest the user was selecting using his or her hand or hands.

In one embodiment, the input confirmation may be a blink, a head movement, or a voice command (e.g., saying "yes" or "confirmed"). In another embodiment, the input confirmation may include no action being taken by the user. For example, the display may indicate that the region of interest is confirmed if no input is received in a predefined period of time (e.g., 5 seconds).

If the region of interest is not confirmed (e.g., the shape is not around the region of interest the user intended to select, the method 700 may proceed to optional step 716. At optional step 716, the method 700 may determine if the method 700 should try detecting the region of interest again with the same ego centric video images. For example, the user may request the head-mounted video device to try detecting the region of interest the user has selected again in the same ego centric video images. If the answer is yes, the method may return to step 708 and steps 708-716 may be repeated.

If the answer to optional step 716 is no, the method 700 may return to step 704 to capture another ego-centric video containing the dynamic hand gesture and steps 704-716 may be repeated. For example, the user may attempt to have the camera capture another ego-centric video of his or her hands to detect the dynamic hand gesture selecting a region of interest.

Returning to optional step 714, if the region of interest is confirmed, then the method 700 may proceed to step 718. At step 718, the method 700 performs an action based on the object in the region of interest. In one embodiment, the action may be automatically filling out a form based on information in the object. For example, the user may enclose a region of interest around a license plate in the ego-centric video image. The license plate may be read to obtain information (e.g., wirelessly accessing a motor vehicle database via the head-mounted video device) associated with the license plate number and a citation for a traffic violation (e.g., a parking ticket, a speeding ticket, and the like) may be automatically filled out with the license plate number and the obtained information.

In another embodiment, the user may select a region of interest with an enclosure that includes a person in a crowd or a moving vehicle in traffic. The person or vehicle may be identified to initiate a tracking action. For example, the shape may be fixed around the person or vehicle as the person or vehicle is moving and the user follows the person or vehicle.

In another embodiment, the user may select a region of interest with the enclosure that includes a sign in a foreign language. An optical character recognition program may be applied to read the text on the sign. A translation may be automatically performed and provided to the user.

At step 720, the method 700 determines whether a new region of interest is to be selected. For example, the user may desire to select another region of interest using the dynamic hand gesture. If the user desires to select a new region of interest, the method 700 may return to step 704 to capture another ego-centric video and repeat the method 700.

However, if a new region of interest is not to be selected, then method 700 may proceed to step 722. For example, the user may be done selecting regions of interest or the head-mounted video device may be turned off. At step 722, the method 700 ends.

As a result, the embodiments of the present disclosure improve the technological area of wearable devices by allowing the wearable devices, such as for example, head-mounted video devices to localize a region of interest within a video frame using a dynamic hand gesture. In addition, the video image is transformed into a command to perform an action.

It should be noted that although not explicitly specified, one or more steps, functions, or operations of the method 700 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 7 that recite a determining operation, or involve a decision, do not necessarily require that both branches of the determining operation be practiced. In other words, one of the branches of the determining operation can be deemed as an optional step.

FIG. 8 depicts a high-level block diagram of a computer or computing device (e.g., a head mounted video device) that can be transformed to into a machine that is dedicated to perform the functions described herein. Notably, no computer or machine currently exists that performs the functions as described herein. As a result, the embodiments of the present disclosure improve the operation and functioning of the general-purpose computer to verify a digital coupon, as disclosed herein.

As depicted in FIG. 8, the computer 800 comprises one or more hardware processor elements 802 (e.g., a central processing unit (CPU), a microprocessor, or a multi-core processor), a memory 804, e.g., random access memory (RAM) and/or read only memory (ROM), a module 805 for localizing a region of interest using a dynamic hand gesture, and various input/output devices 806 (e.g., storage devices, including but not limited to, a tape drive, a floppy drive, a hard disk drive or a compact disk drive, a receiver, a transmitter, a speaker, a display, a speech synthesizer, an output port and an input port). Although only one processor element is shown, it should be noted that the general-purpose computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer-readable instructions pertaining to the method(s) discussed above can be used to configure a hardware processor to perform the steps, functions and/or operations of the above disclosed methods. In one embodiment, instructions and data for the present module or process 805 for localizing a region of interest using a dynamic hand gesture (e.g., a software program comprising computer-executable instructions) can be loaded into memory 804 and executed by hardware processor element 802 to implement the steps, functions or operations as discussed above. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer-readable or software instructions relating to the above described method(s) can be perceived as a programmed processor or a specialized processor. As such, the present module 805 for localizing a region of interest using a dynamic hand gesture (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for localizing a region of interest in an ego-centric video using a dynamic hand gesture, comprising:
   capturing, by a processor, the ego-centric video containing the dynamic hand gesture;
   compensating, by the processor, for a drift of a head-mounted video device during the capturing of the ego-centric video;
   analyzing, by the processor, a frame of the ego-centric video to detect pixels that correspond to a fingertip using a hand segmentation algorithm;
   analyzing, by the processor, temporally one or more frames of the ego-centric video to compute a path of the fingertip in the dynamic hand gesture, wherein the analyzing temporally the one or more frames of the ego-centric video to compute the path of the fingertip comprises performing a localization on a frame-by-frame basis;
   localizing, by the processor, the region of interest based on the path of the fingertip in the dynamic hand gesture, wherein the region of interest is larger than the frame and the path is traced using a combination of the dynamic hand gesture and a movement of the head-mounted video device, wherein an object in the region of interest is stitched together to fit in the region of interest in one frame; and
   performing, by the processor, an action based on the object in the region of interest.

2. The method of claim 1, wherein the capturing comprises receiving a prompt to initiate the capturing of the ego-centric video, wherein the prompt comprises at least one of: an audio command, a tap or a swipe gesture.

3. The method of claim 1, wherein the analyzing the frame of the ego-centric video to detect pixels that correspond to the fingertip comprises:
   detecting, by the processor, the pixels that correspond to a hand region;
   generating, by the processor, a binary mask of pixels indicating hand pixels within the hand region;
   applying, by the processor, an image processing to the binary mask to reduce a probability of false positives and false negatives occurring in the binary mask; and
   identifying, by the processor, the fingertip as one or more of the pixels within the hand region that have a most extreme coordinate values along a dimension.

4. The method of claim 3, wherein the dimension comprises at least one of a horizontal dimension, a vertical dimension, a diagonal dimension, a row or a column.

5. The method of claim 1, wherein the analyzing temporally one or more frames of the ego-centric video to compute the path of the fingertip comprises performing a localization on a single frame and using a tracking algorithm to detect the fingertip in subsequent frames.

6. The method of claim 1, wherein a fingertip mark is displayed on the fingertip on a display of the head-mounted video device.

7. The method of claim 1, wherein a line is displayed that traces over the path of the fingertip in a display of the head-mounted video device.

8. The method of claim 1, further comprising:
   receiving, by the processor, a signal indicating that the dynamic hand gesture is completed.

9. The method of claim 1, further comprising:
   determining, by the processor, that the dynamic hand gesture is completed when the path of the fingertip returns to approximately a same location that the fingertip began.

10. The method of claim 1, wherein the compensating further comprises:
    tracking, by the processor, salient features around a selected location of the frame; and estimating, by the processor, a distortion that took place between the frame and subsequent frames of the ego-centric video based on the salient features to compensate for the drift of the head-mounted video device capturing the ego-centric video.

11. The method of claim 10, wherein the distortion is assumed to be translational motion.

12. The method of claim 1, wherein the compensating further comprises:
computing, by the processor, a motion vector field indicating pixel-wise displacements that occurred between frames; and
estimating, by the processor, a distortion that took place between the frame and subsequent frames of the ego-centric video to compensate for the drift of the head-mounted video device capturing the ego-centric video based on the motion vector field.

13. The method of claim 1, further comprising:
displaying, by the processor, a shape around the region of interest in a display of the head-mounted video device; and
receiving, by the processor, a confirmation input that the shape correctly surrounds the region of interest.

14. The method of claim 1, wherein the object comprises a text and the performing the action comprises:
recognizing, by the processor, the text using an optical character recognition program.

15. The method of claim 14, further comprising:
automatically populating, by the processor, one or more fields of a form using the text that is identified.

16. The method of claim 14, further comprising:
translating, by the processor, the text in a first language to a second language.

17. The method of claim 1, wherein the object comprises a moving object and the performing the action comprises:
tracking, by the processor, the moving object within the region of interest.

18. A non-transitory computer-readable medium storing a plurality of instructions, which when executed by a processor, cause the processor to perform operations for localizing a region of interest in an ego-centric video using a dynamic hand gesture, comprising:
capturing the ego-centric video containing the dynamic hand gesture;
compensating for a drift of a head-mounted video device during the capturing of the ego-centric video;
analyzing a frame of the ego-centric video to detect pixels that correspond to a fingertip using a hand segmentation algorithm;
analyzing temporally one or more frames of the ego-centric video to compute a path of the fingertip in the dynamic hand gesture, wherein the analyzing temporally the one or more frames of the ego-centric video to compute the path of the fingertip comprises performing a localization on a frame-by-frame basis;
localizing the region of interest based on the path of the fingertip in the dynamic hand gesture, wherein the region of interest is larger than the one or more frames and the path is traced using a combination of the dynamic hand gesture and a movement of the head-mounted video device, wherein an object in the region of interest is stitched together to fit in the region of interest in one frame; and
performing an action based on an object in the region of interest.

19. A method for localizing a region of interest in an ego-centric video using a dynamic hand gesture, comprising:
capturing, by a processor, the ego-centric video containing the dynamic hand gesture;
compensating, by the processor, for a drift of a head-mounted video device during the capturing of the ego-centric video;
detecting, by the processor, a hand in a frame of the ego-centric video using a binary mask generated from a hand segmentation algorithm;
identifying, by the processor, pixels that correspond to a fingertip of the hand based on one or more of the pixels of the hand that have the most extreme coordinate values;
analyzing, by the processor, temporally one or more subsequent frames of the ego-centric video to compute a path of the fingertip in the dynamic hand gesture using a motion tracking algorithm until the path is completed on a frame-by-frame basis;
tracing, by the processor, the path of the fingertip in a display of a head-mounted video device using a combination of the dynamic hand gesture and a movement of the head-mounted video device;
localizing, by the processor, the region of interest based on the path of the fingertip in the dynamic hand gesture, wherein the region of interest is larger than the frame, wherein an object in the region of interest is stitched together to fit in the region of interest in one frame;
cropping, by the processor, the object in the region of interest; and
performing, by the processor, an action based on the object in the region of interest.

* * * * *